United States Patent [19]

Reuter

[11] Patent Number: 5,116,293
[45] Date of Patent: May 26, 1992

[54] FOUR WHEEL DRIVE TRANSFER CASE WITH CV JOINT ANGLED FRONT OUTPUT SHAFT

[75] Inventor: David C. Reuter, Fort Wayne, Ind.
[73] Assignee: Dana Corporation, Toledo, Ohio
[21] Appl. No.: 480,101
[22] Filed: Feb. 14, 1990
[51] Int. Cl.$^5$ .......................... F16H 1/38; F16D 3/00
[52] U.S. Cl. ...................... 475/202; 464/15; 403/57; 475/222
[58] Field of Search ............... 475/202, 222; 180/245, 180/246, 906; 464/15, 145, 906; 403/34, 57

[56] References Cited

U.S. PATENT DOCUMENTS

| | | | |
|---|---|---|---|
| 2,716,461 | 8/1955 | MacPherson | 475/202 X |
| 2,822,880 | 2/1958 | Gregory | 464/145 X |
| 2,875,599 | 3/1959 | Gregory | 464/145 |
| 2,924,985 | 2/1960 | Crankshaw | 74/378 |
| 3,262,512 | 7/1966 | O'Brien | 475/222 X |
| 3,324,682 | 6/1967 | Bendler | 64/21 |
| 3,464,232 | 9/1969 | Hutchinson | 64/21 |
| 3,688,521 | 9/1972 | Smith et al. | 64/21 |
| 4,289,213 | 9/1981 | Seaman | 180/233 |
| 4,303,400 | 12/1981 | Yano et al. | 440/75 |
| 4,469,188 | 9/1984 | Mita | 180/215 |
| 4,618,021 | 10/1986 | Ashikawa | 475/202 X |
| 4,690,015 | 9/1987 | Nagano et al. | 74/665 GE |
| 4,793,212 | 12/1988 | Welschof et al. | 475/222 |
| 4,840,087 | 6/1989 | Welschof et al. | 475/222 |
| 4,860,612 | 8/1989 | Dick et al. | 74/665 H |
| 4,862,768 | 9/1989 | Iwatsuki et al. | 475/221 X |
| 4,950,206 | 8/1990 | Jacob | 464/145 X |

FOREIGN PATENT DOCUMENTS 518148  3/1957  Italy ...................... 475/222

Primary Examiner—Rodney H. Bonck
Assistant Examiner—Benjamin Levi
Attorney, Agent, or Firm—MacMillan, Sobanski & Todd

[57] ABSTRACT

A torque transfer case includes an output shaft angled relative to an input shaft by the use of a constant velocity (CV) universal joint. The CV joint is contained within a hollow drive sprocket rotatably supported within a housing by a pair of spaced apart, different sized bearing assemblies, and is coupled to input shaft via a drive chain. The drive sprocket is provided with a cylindrical opening at one end thereof and a smaller cylindrical opening at an opposite end thereof. The different sized openings produce a differential pressure across the openings when the sprocket is rotated, thus causing oil contained in the housing to flow through the sprocket and lubricate the CV joint. The output shaft has one end which extends into the one cylindrical opening of the drive sprocket and is coupled to the CV joint, and an opposite end which is rotatably supported within the housing by a single bearing unit. The torque transfer case can be a four wheel drive transfer case and include a differential for dividing torque between a rear output shaft and an angled front output shaft.

16 Claims, 2 Drawing Sheets

FOUR WHEEL DRIVE TRANSFER CASE WITH CV JOINT ANGLED FRONT OUTPUT SHAFT

CROSS REFERENCE TO RELATED APPLICATION

This application is related in subject matter to U.S. Pat. No. 4,860,612 entitled VEHICLE TORQUE TRANSFER CASE FOR A FOUR WHEEL DRIVE SYSTEM, which is herein incorporated by reference

BACKGROUND OF THE INVENTION

The present invention relates generally to a vehicle torque transfer case and, in particular, to a four wheel drive transfer case which includes an angled front output shaft for connection to an input shaft of a front differential.

Four wheel drive systems for vehicles are becoming increasingly common. In the past, such systems typically included a transfer case connected to the output of a vehicle transmission which was provided with selective control means operable by the vehicle driver for selecting whether the vehicle is to be operated in either a two wheel or four wheel drive mode. Recently, certain vehicles have been provided with a "full time" four wheel drive system. In these systems, which have become known as all wheel drive systems, the transfer cases are generally provided with an interaxle differential for dividing torque between the vehicle front and rear differentials. Also, in order to prevent excessive slipping between the front and rear wheels, these transfer cases typically include a selectively engageable clutch means which is operative to lock the interaxle differential upon sensing a predetermined slippage between the front and rear output shafts of the transfer case.

In some vehicles, it can be difficult to locate the transfer case in such a manner to provide the efficient transfer of torque to the front and rear differentials, while maintaining sufficient vehicle ground clearance.

SUMMARY OF THE INVENTION

The present invention is directed to a vehicle torque transfer case wherein an output shaft is angled relative to an input shaft by means of a constant velocity (CV) universal joint. In particular, the CV joint is located within a drive sprocket rotatably supported within a transfer case housing and coupled to the input shaft by means such as a drive chain. The drive sprocket defines a first cylindrical opening of a first diameter at one end thereof and a second cylindrical opening of a second diameter at an opposite end thereof. An output shaft is rotatably supported within the housing and has one end extending into the sprocket and coupled to the CV joint. In accordance with the present invention, the first and second openings are formed of different diameters such that a pressure differential is created across the sprocket openings when the sprocket is rotating, thus forcing oil contained in the transfer case housing through the sprocket to lubricate the components of the CV joint.

An additional feature of the transfer case concerns the specific manner in which the drive sprocket is rotatably supported with the transfer case housing. More specifically, the drive sprocket includes a first hub at one end thereof which is rotatably supported in the housing by a first bearing means and a second hub at an opposite end thereof which is rotatably supported by a second bearing means. The first bearing means, through which the output shaft extends, defines a first inner diameter which is larger than the inner diameter of the second bearing. This enables the transfer case to accommodate an output shaft at a greater angular displacement.

A further feature of the torque transfer case relates to the manner in which the output shaft is rotatably supported within the transfer case housing. In particular, the output shaft is solely rotatably supported at the one end thereof by the CV joint, and is solely rotatably supported at the opposite end thereof by a single bearing means. Such an arrangement simplifies and facilitates the construction of the transfer case by eliminating the need for an intermediate bearing between the CV joint and the single bearing means.

The torque transfer case of the present invention is preferably utilized as a four wheel drive transfer case wherein a differential means is provided for drivingly connecting the input shaft to the front and rear output shafts and dividing torque therebetween. Further, clutch means are typically provided for selectively locking the differential means to prevent slipping between the front and rear output shafts. While the input shaft and the rear output shaft are aligned in generally straight line relationship, the front output shaft has a rotational axis which is oriented in a non-parallel, non-intersecting relationship with the rotational axis of the rear output shaft such that the rotational axis of the front output shaft and the rotational axis of the rear output shaft cooperate to define skew lines. The CV joint of the present invention is connected between the differential means and the front output shaft.

The above, as well as other advantages of the present invention, will become readily apparent to one skilled in the art from reading the following detailed description in conjunction with the attached drawings.

DESCRIPTION OF THE PREFERRED EMBODIMENT

Figure 1:
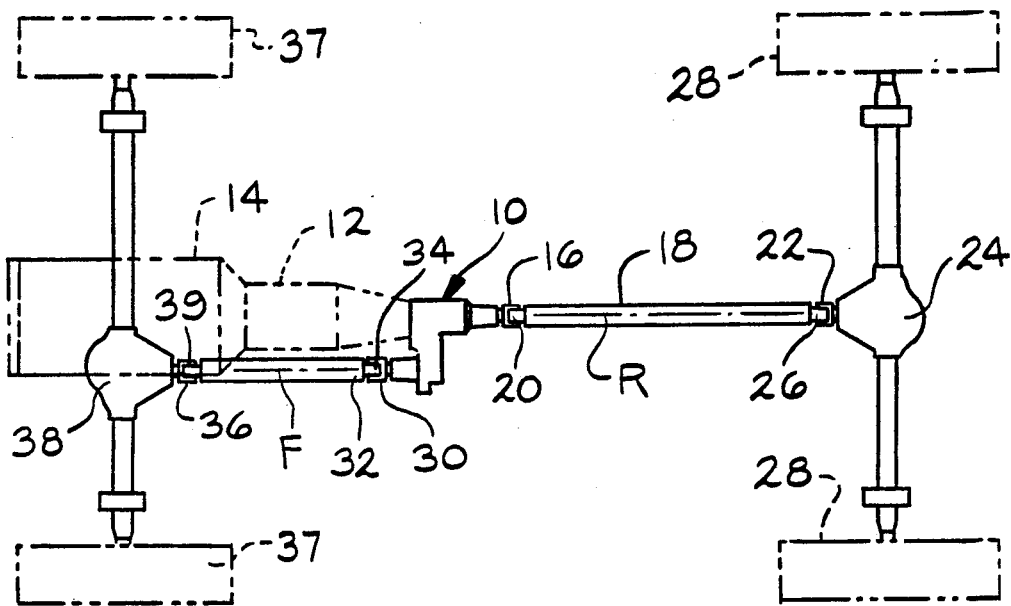
FIG. 1 is a top plan view of a four wheel drive system which utilizes the transfer case of the present invention to provide connection to both the front and rear differentials of the vehicle.
Figure 2:
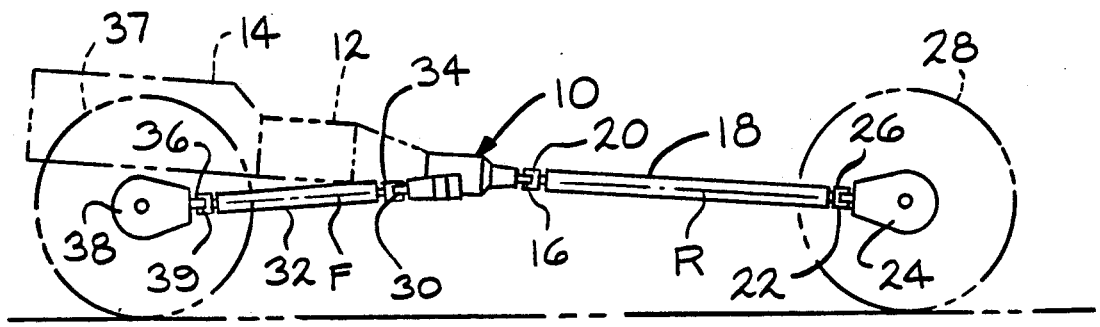
FIG. 2 is a side elevational view of FIG. 1, illustrating the angled relationship between the front and rear drive shafts.

Referring first to FIGS. 1 and 2, there is shown a vehicle four wheel drive system which utilizes the transfer case of the present invention. As shown in FIGS. 1 and 2, a transfer case 10 is secured to the rear of a transmission unit 12 (shown in phantom) which in turn is coupled to a drive line 14 (also shown in phantom). As will be discussed, the transmission 12 is provided with an output shaft which is coupled to an input shaft of the transfer case 10. The transfer case 10 includes a rear output shaft or yoke 16 connected to the forward end of a rear drive shaft 18 by means of a conventional universal joint coupling 20. The rearward end of the drive shaft 18 is coupled to an input shaft or yoke 22 of a rear differential 24 by means of a universal joint coupling 26. The rear differential 24 is adapted to divide torque from the drive shaft 18 between the rear wheels 28.

The transfer case 10 is provided with a front output shaft or yoke 30 which is connected to the rearward end of a front drive shaft 32 by means of a universal joint coupling 34. The front drive shaft 32 has a forward end connected to an input shaft or yoke 36 of a front differential unit 38 by means of a universal joint coupling 39 and is adapted to divide torque received from the drive shaft 32 between the vehicle front wheels 37.

As shown in FIGS. 1 and 2, the rear drive shaft 18 is adapted to rotate about an axis R, while the front drive shaft 32 is adapted to rotate about an axis F. In the preferred embodiment of the invention as illustrated in FIGS. 1 and 2, the rear drive shaft 18 is angled downwardly from the transfer case 10 to the rear differential 24, while the front drive shaft 32 is angled downwardly from the transfer case 10 to the front differential 38. Preferably, the rear output shaft 16 of the transfer case 10, the rear drive shaft 18, and the input shaft 22 to the rear differential 24, are all in a substantially straight line relationship along the axis R. Also, preferably the front output shaft 30 of the transfer case 10, the front drive shaft 32, and the input shaft 36 to the front differential 38 are also in a substantially straight line relationship along the front axis F. However, in some vehicular applications, it may not be possible to achieve either or both of the front and rear straight-line relationships. In these instances, additional drive arrangements can be used as further described in U.S. Pat. No. 4,860,612.

Further, in the preferred embodiment, the axes R and F are located in spaced apart, vertically oriented parallel planes. In order to accomplish this drive arrangement, the front output shaft 30 must be laterally spaced from and angled relative to the rear output shaft 16, as shown in FIG. 2, such that the axis of the front output shaft 30 is non-parallel and non-intersecting with the axis of the rear output shaft 16, and thus define skew lines. As will be discussed, angular connection is accomplished by way of a constant velocity universal joint.

Figure 3:
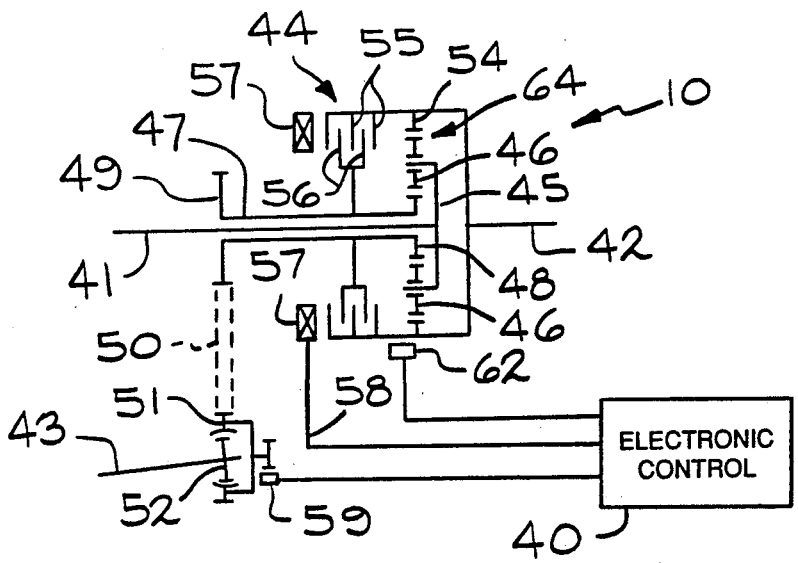
FIG. 3 is a schematic diagram illustrating one example of a transfer case which can utilize a CV joint angled front output shaft of the present invention.

Referring now to FIG. 3, there is shown a schematic diagram of the internal components of the transfer case 10 which can incorporate the angled output shaft arrangement of the present invention. Also shown in FIG. 3 are certain electrical connections to an electronic control which is represented in FIG. 3 as a block 40. As shown in FIG. 3, the transfer case 10 includes an input shaft 41 coupled to the output shaft of the vehicle transmission 12 (shown in FIGS. 1 and 2). The transfer case 10 also includes a rear output shaft 42 adapted to be connected to the rear driveshaft 18, and a front output shaft 43 for connection to the front driveshaft 32. The transfer case uses an interaxle planetary gear differential, generally indicated by the reference numeral 64, for dividing torque between the rear output shaft 42 and the front output shaft 43. Also, an electromagnetic friction clutch, generally represented by reference numeral 44, is provided for selectively locking the planetary gear differential to prevent any slip between the front and rear output shafts.

In particular, the input shaft 41 is secured to a planet carrier 45 which carries a plurality of circumferentially spaced and individually rotatable planet gears 46. A sleeve member 47 is rotatably mounted about the input shaft 41 and has one end which carries a sun gear 48 and an opposite end which carries a drive sprocket 49. The drive sprocket is connected to drive a drive chain 50 which in turn drives a second drive sprocket 51 rotatably supported within the transfer case housing. As will be discussed in more detail hereinafter, a constant velocity universal joint 52 is located within the drive sprocket 51 and is connected to drive the angled front output shaft 43. A ring gear 54 of the planetary gear differential 64 is secured to the rear output shaft 42.

The electromagnetic clutch assembly 44 includes a first group of clutch plates 55 which are secured for rotation with the ring gear 54, and a second group of clutch plates 56 which are secured to the sleeve member 47 for rotation with the sun gear 48. An annular clutch coil 57 is positioned adjacent the clutch plates 55 and 56 and is adapted to receive a clutch engagement signal on a line 58 from the electronic control 40. The electromagnetic clutch 44 has a construction wherein, when a clutch engagement signal is generated to energize the coil 57, the magnetic field generated by the energized coil 57 exerts a magnetic force to urge the clutch plates 55 and 56 into frictional engagement with one another to prevent relative rotation therebetween, thus locking the sun gear 48 and the ring gear 54 together. This prevents any relative slip between the rear and front output shafts.

The speed of the front output shaft 43 is monitored by a speed sensor 59 which can be positioned adjacent the periphery of the teeth of a toothed gear wheel mounted for rotation with the drive sprocket. The speed sensor 59 generates a front output shaft speed signal to the electronic control 40. Similarly, the speed of the rear output shaft 42 is monitored by a speed sensor 62 which can be positioned adjacent the periphery of the ring gear 54, and can be adapted to sense a plurality of circumferentially spaced external teeth provided about the periphery of the ring gear. The speed sensor 62 generates a rear output shaft speed signal to the electronic control 40.

As previously mentioned, the planetary gear differential 64 is provided for dividing torque between the rear output shaft 42 and the front output shaft 43. Normally, the clutch coil 57 is not energized such that a predetermined slippage can occur between the front and rear output shafts to accommodate slightly different front and rear wheel speeds which occur during normal traction condition such as when turning the vehicle. However, as discussed in more detail in U.S. patent application Ser. No. 137,394, now U.S. Pat. No. 4,937,750 when slippage between the front and rear wheels exceeds a predetermined amount, the electronic control 40 will generate a clutch engagement signal which causes the planetary gear differential to lock and provide a direct drive connection between the input shaft 41 and the front and rear output shafts 43 and 42. In particular, when the clutch coil 57 is energized, the ring gear 54 is locked relative to the sun gear 48 to prevent relative rotation therebetween. When the ring gear 54 is locked relative to the sun gear 48, the planet gears 46 are prevented from rotating about their associated shafts, thereby preventing rotation of the planet carrier 45 relative to either the ring gear 54 or the sun gear 48.

It should be noted that the transfer case illustrated in FIG. 3 is only one example of a transfer case which can utilize the angled output shaft arrangement of the present invention, and that other transfer cases can also incorporate the present invention.

Figure 4:
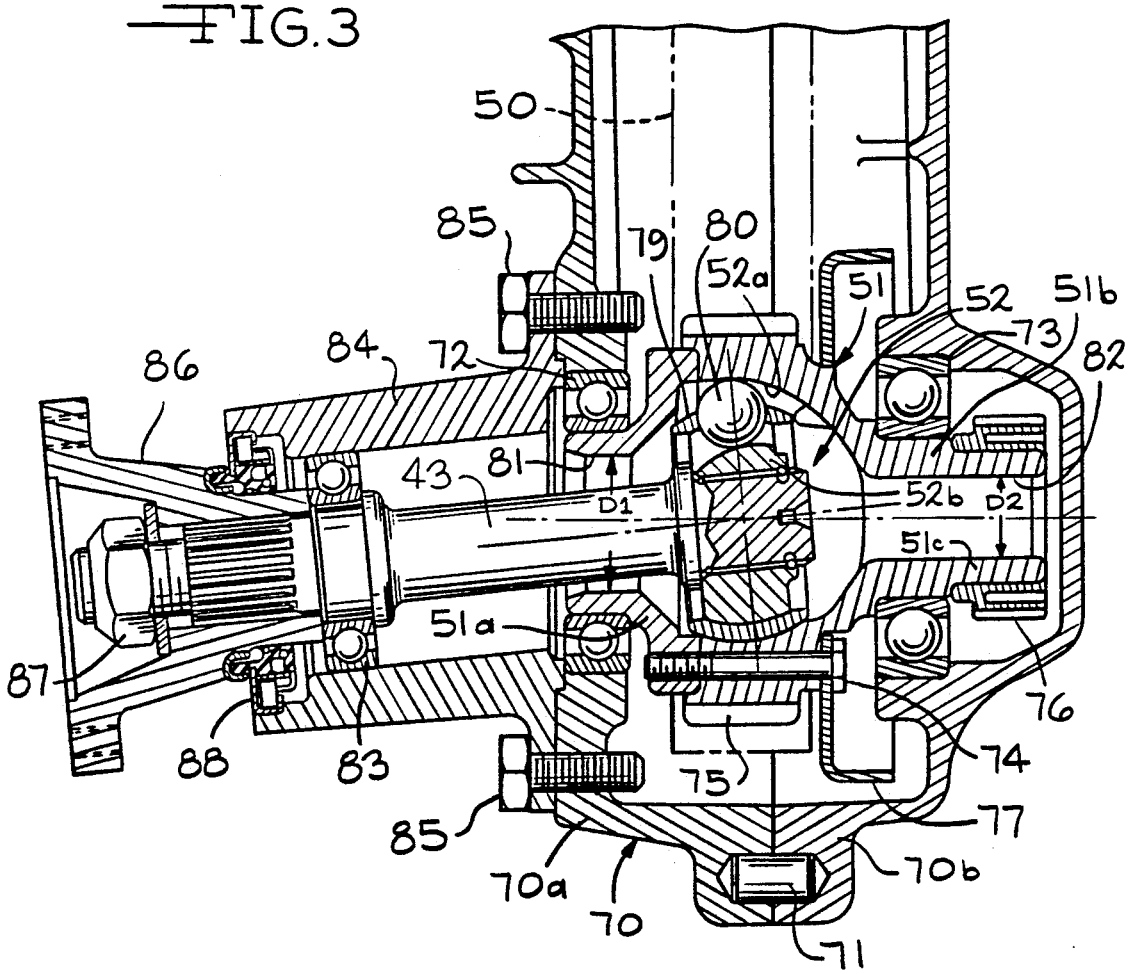
FIG. 4 is a fragmentary sectional view through the portion of the transfer case assembly illustrating the CV joint connection to the angled front output shaft.

Referring to FIG. 4, the specific construction of the angled shaft arrangement of the present invention will now be discussed. In particular, the transfer case 10 includes an outer split case housing 70 consisting of a front section 70a and a rear section 70b which are secured together by a plurality of bolts (not shown) and locating pins such as a locating pin 71. The drive chain 50 shown in FIG. 2 is represented in phantom in FIG. 4. The drive chain 50 is adapted to drive the drive sprocket 51 which is rotatably supported within the transfer case by a pair of bearing assemblies 72 and 73. In FIG. 4, the drive sprocket 51 is shown as a two-piece structure and includes a front hub section 51a which is secured to a rear hub section 51b by means of a plurality of bolts 74 (only one of which is shown in FIG. 4). Alternatively, the sections 51a and 51b can be secured together by welding. The rear hub section 51b of the sprocket 51 is provided with a plurality of external sprocket teeth 75 for engaging the associated drive chain 50. It should be noted that, as an alternative to the chain 50, the sprocket 51 could be driven by a gear train, in which case the sprocket teeth 75 would be gear teeth.

The drive sprocket includes a rear extension portion 51c on which a pickup gear 76 is mounted. The gear 76 cooperates with the front speed sensor 59 (not shown in FIG. 4) for generating the front speed signal. Also, a cup shaped tone wheel 77 is secured to the drive sprocket 51 by means of the bolts 74.

As previously mentioned, the drive arrangement of the present invention incorporates a constant velocity universal joint within the drive sprocket 51. As shown in FIG. 4, the constant velocity joint includes an outer race 52a formed integrally in a hollow section of the drive sprocket, and a pivoting inner race 52b secured (by a splined connection) to the inner end of the front output shaft 43 which extends into the drive sprocket.

A plurality of circumferentially spaced torque transmitting balls 80 are received within cooperating grooves formed in the inner and outer races, and are retained therein by means of a cage member 79.

In accordance with the present invention, the diameter of an inner cylindrical opening 81 in the front hub section 51a is formed at a diameter D1 different from a diameter D2 of an inner cylindrical opening 82 in the rear hub section 51b. In FIG. 4, the diameter D1 is larger than the diameter D2. Thus, when the sprocket 51 is rotating, a pressure differential will be developed across the openings, thereby forcing oil within the housing through the sprocket to lubricate the components of the CV joint. Additionally, as shown in FIG. 4, the front bearing assembly 72 is provided with an internal diameter larger than the rear bearing assembly 73. This enables the drive sprocket 51 to be constructed with a larger front cylindrical opening 81 to accommodate a front output shaft oriented at a greater angular displacement.

The forward end of the front output shaft 43 is rotatably supported by a bearing assembly 83 within an end cap 84 secured to the front section of the transfer case by means of a plurality of bolts 85. If desired, the end cap 84 can be interchanged with another end cap to enable the transfer case to accommodate a front output shaft oriented at a different angular displacement. Alternatively, if desired, the end cap 84 can be formed integrally with the front section 70a of the transfer case. The forward end of the front output shaft 43 is secured to a connecting member 86 by a splined connection and a nut 87 which is threaded onto a front end portion of the front output shaft. A seal assembly 88 is mounted in the forward end of the end cap 84 and sealingly engages an external cylindrical surface of the connecting member 86.

It will be appreciated that the front output shaft 43 is supported at its forward end solely by the bearing assembly 83, and at its rearward end solely by the constant velocity joint 52, and there are no intermediate support bearings between these two points. Such a construction simplifies the manufacturing and assembly of the output shaft, and eliminates the need to precisely align an intermediate bearing along the shaft.

The transfer case and drive system of the present invention have been illustrated and described in what is considered to represent its preferred embodiment. However, it will be appreciated that the transfer case and drive system can be modified without departing from the spirit or scope of the attached claims.

What is claimed is:

1. A torque transfer case comprising:
   a housing;
   an input shaft rotatably supported within said housing;
   a hollow drive member including a drive sprocket rotatably supported within said housing;
   means including a drive chain for drivingly connecting said input shaft to said drive member;
   said drive member having a first cylindrical opening of a first diameter at one end thereof and having a second cylindrical opening of a second diameter at an opposite end thereof;
   a constant velocity universal joint contained within said drive member;
   an output shaft rotatably supported within said housing and having one end extending into said first opening of said drive member and coupled to said constant velocity universal joint;
   said first and second diameters being different from one another such that a pressure differential is created across said drive member openings when said drive member is rotated to force oil contained in said housing through said drive member to lubricate said constant velocity universal joint.

2. The torque transfer case according to claim 1 wherein said second diameter is smaller than said first diameter.

3. The torque transfer case according to claim 2 wherein said drive member includes a first hub at said one end thereof rotatably supported in said housing by a first bearing means and a second hub at said opposite end thereof rotatably supported by a second bearing means, said first bearing means defining a first inner diameter and said second bearing means defining a second inner diameter smaller than said first inner diameter.

4. The torque transfer case according to claim 1 wherein said output shaft is solely rotatably supported at said one end thereof by said constant velocity universal joint and is solely rotatably supported at said opposite end by a single bearing means.

5. The torque transfer case according to claim 1 wherein said output shaft is a first output shaft and the torque transfer case includes a second output shaft rotatably supported within said housing and means for drivingly connecting said input shaft to said second output shaft.

6. The torque transfer case according to claim 5 wherein said means for drivingly connecting said input shaft to said second output shaft includes a differential.

7. The torque transfer case according to claim 5 wherein said means for drivingly connecting said input shaft to said second output shaft includes a clutch.

8. The torque transfer case according to claim 5 wherein said first and second output shafts respectively have rotational axes oriented in a non-parallel, non-intersecting relationship with each other such that said rotational axes define skew lines.

9. A torque transfer case comprising:
a housing;
an input shaft rotatably supported within said housing;
a hollow drive member rotatably supported within said housing;
means for drivingly connecting said input shaft to said drive member;
a constant velocity universal joint contained within said drive member;
an output shaft rotatably supported within said housing and having one end extending into an opening in said drive member and coupled to said constant velocity universal joint;
said output shaft being solely rotatably supported at said one end thereof by said constant velocity universal joint; and
said housing including only a single bearing means for supporting the opposite end of said output shaft.

10. The torque transfer case according to claim 9 wherein said hollow drive member defines a first cylindrical opening of a first diameter at one end thereof and a second cylindrical opening of a second diameter at an opposite end thereof, said first and second diameters being different from one another such that a pressure differential is created when said hollow drive member is rotating to force oil contained in said housing through said hollow drive member to lubricate said constant velocity universal joint.

11. The torque transfer case according to claim 9 wherein said hollow drive member includes a first hub at one end thereof rotatably supported in said housing by a first bearing means and a second hub at an opposite end thereof supported by a second bearing means, said first bearing means defining a first inner diameter and said second bearing means defining a second inner diameter smaller than said first inner diameter.

12. The torque transfer case according to claim 9 wherein said hollow drive member includes a drive sprocket formed circumferentially thereon between said first hub and said second hub and said means for drivingly connecting said input shaft to said drive member includes a drive chain.

13. The torque transfer case according to claim 9 wherein said output shaft is a first output shaft and the torque transfer case includes a second output shaft rotatably supported within said housing and means for drivingly connecting said input shaft to said second output shaft.

14. The torque transfer case according to claim 13 wherein said means for drivingly connecting said input shaft to said second output shaft includes a differential.

15. The torque transfer case according to claim 13 wherein said means for drivingly connecting said input shaft to said second output shaft includes a clutch.

16. The torque transfer case according to claim 13 wherein said first and second output shafts respectively have rotational axes oriented in a non-parallel, non-intersecting relationship with each other such that said rotational axes define skew lines.

* * * * *